US010907059B2

(12) United States Patent
Chopra et al.

(10) Patent No.: US 10,907,059 B2
(45) Date of Patent: *Feb. 2, 2021

(54) WATERBORNE CLEAR INK COMPOSITIONS

(71) Applicant: Xerox Corporation, Norwalk, CT (US)

(72) Inventors: Naveen Chopra, Oakville (CA); Robert Christopher Claridge, Gilford (CA); Biby Esther Abraham, Mississauga (CA); Carolyn Moorlag, Mississauga (CA); Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/997,753

(22) Filed: Jun. 5, 2018

(65) Prior Publication Data

US 2019/0367751 A1    Dec. 5, 2019

(51) Int. Cl.
  *C09D 11/104* (2014.01)
  *B41J 2/005* (2006.01)
  (Continued)

(52) U.S. Cl.
  CPC .......... *C09D 11/104* (2013.01); *B41J 2/0057* (2013.01); *C09D 11/106* (2013.01); *C09D 11/033* (2013.01)

(58) Field of Classification Search
  CPC ... C09D 11/104; C09D 11/106; C09D 11/033; C09D 11/03; C09D 11/108; B41J 2/0057; B41C 1/1033; B41M 5/025; B41M 1/06
  See application file for complete search history.

(56) References Cited

U.S. PATENT DOCUMENTS 4,340,519 A * 7/1982 Kotera ............... C08L 67/02
  260/DIG. 38
4,963,652 A * 10/1990 Tortorici ............ C09D 11/104
  523/160

(Continued)

FOREIGN PATENT DOCUMENTS

DE      2011052991 A1    2/2013
WO   WO2017/079130 A1    5/2017

OTHER PUBLICATIONS

Mark Alger, "Polymer Science Dictionary, 2nd Edition", Chapman & Hall, New York pp. 278-279, (1997).*

(Continued)

*Primary Examiner* — Alexander C Kollias
(74) *Attorney, Agent, or Firm* — Marylou J. Lavoie, Esq. LLC

(57) ABSTRACT

An aqueous ink composition including water; an optional co-solvent; a sulfonated polyester, wherein the sulfonated polyester has a degree of sulfonation of at least about 3.5 mol percent; and an isoprene rubber. A process of digital offset printing including applying an ink composition onto a re-imageable imaging member surface at an ink take up temperature, the re-imageable imaging member having dampening fluid disposed thereon; forming an ink image; transferring the ink image from the re-imageable surface of the imaging member to a printable substrate at an ink transfer temperature; wherein the ink composition comprises water; an optional co-solvent; a sulfonated polyester having a degree of sulfonation of at least about 3.5 mol percent; and an isoprene rubber. A process including combining a sulfonated polyester resin, having a degree of sulfonation of at least about 3.5 mol percent, water, an optional co-solvent, and an isoprene rubber to form an (Continued)

aqueous ink composition, wherein the ink composition is substantially colorless.

15 Claims, 4 Drawing Sheets

(51) Int. Cl.
*C09D 11/106* (2014.01)
*C09D 11/033* (2014.01)

(56) References Cited

U.S. PATENT DOCUMENTS

| | | | |
|---|---|---|---|
| 4,990,593 A * | 2/1991 | Blount | C08G 63/6884 524/602 |
| 7,312,011 B2 | 12/2007 | Patel et al. | |
| 9,592,699 B2 | 3/2017 | Stowe et al. | |
| 9,644,105 B2 | 5/2017 | Breton et al. | |
| 9,822,267 B1 | 11/2017 | Mayo et al. | |
| 2003/0018100 A1 * | 1/2003 | Foucher | C09D 11/104 523/160 |
| 2003/0187098 A1 * | 10/2003 | Chen | C09D 11/322 523/160 |
| 2005/0192378 A1 | 9/2005 | Uang | |
| 2009/0304927 A1 * | 12/2009 | Kamibayashi | C09D 11/40 427/258 |
| 2012/0103212 A1 | 5/2012 | Stowe et al. | |
| 2014/0208969 A1 | 7/2014 | Sieger | |
| 2014/0364548 A1 * | 12/2014 | Everhardus | C09D 11/322 524/166 |
| 2015/0174887 A1 | 6/2015 | Moorlag et al. | |
| 2015/0175820 A1 | 6/2015 | Breton et al. | |
| 2018/0072899 A1 | 3/2018 | Allen et al. | |
| 2018/0105710 A1 * | 4/2018 | Hong | C09D 11/38 |

OTHER PUBLICATIONS

Naveen Chopra, et al., U.S. Appl. No. 16/000,401, filed Jun. 5, 2018.
Naveen Chopra, et al., U.S. Appl. No. 15/886,381, filed Feb. 1, 2018.
Naveen Chopra, et al., U.S. Appl. No. 15/997,760, filed Jun. 5, 2018.
Naveen Chopra, et al., U.S. Appl. No. 15/997,770, filed Jun. 5, 2018.
Naveen Chopra, et al., U.S. Appl. No. 15/997,781, filed Jun. 5, 2018.
Naveen Chopra, et al., U.S. Appl. No. 15/997,746, filed Jun. 5, 2018.
Extended European Search Report issued in European Application No. 19177756.4-1014, dated Nov. 6, 2019.
Canadian Office Action issued in Canadian Application No. 3,044,768, dated Jul. 13, 2020.

* cited by examiner

WATERBORNE CLEAR INK COMPOSITIONS

RELATED APPLICATIONS

Commonly assigned U.S. patent application Ser. No. 15/997,746, entitled "Aqueous Ink Composition Comprising Polyisoprene", filed concurrently herewith, which is hereby incorporated by reference herein in its entirety, describes an aqueous ink composition including water; an optional co-solvent; an optional colorant; a sulfonated polyester; and an isoprene rubber.

BACKGROUND

Disclosed herein is an aqueous ink composition comprising water; an optional co-solvent; a sulfonated polyester, wherein the sulfonated polyester has a degree of sulfonation of at least about 3.5 mol percent; and an isoprene rubber.

Further disclosed is a process of digital offset printing, the process comprising applying an ink composition onto a re-imageable imaging member surface at an ink take up temperature, the re-imageable imaging member having dampening fluid disposed thereon; forming an ink image; transferring the ink image from the re-imageable surface of the imaging member to a printable substrate at an ink transfer temperature; wherein the ink composition comprises water; an optional co-solvent; a sulfonated polyester, wherein the sulfonated polyester has a degree of sulfonation of at least about 3.5 mol percent; and an isoprene rubber.

Further disclosed is a process comprising combining a sulfonated polyester resin, wherein the sulfonated polyester has a degree of sulfonation of at least about 3.5 mol percent, water, an optional co-solvent, and an isoprene rubber to form an aqueous ink composition, wherein the ink composition is substantially colorless.

Typical lithographic and offset printing techniques utilize plates that are permanently patterned, and are, therefore, useful only when printing a large number of copies of the same image, such as magazines, newspapers, and the like. Variable data digital lithography or digital offset lithographic printing has been developed as a system that uses a non-patterned re-imageable surface, which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. Ink applied thereover is retained in the pockets formed by the removal of the dampening fluid. The inked surface is then brought into contact with a substrate, such as paper, plastic or metal and the ink transfers from the pockets in the dampening fluid layer to the substrate. The dampening fluid may then be removed, a new uniform layer of dampening fluid applied to the re-imageable surface, and the process repeated.

Digital offset printing systems use offset-type inks that are specifically designed and optimized to be compatible with the materials the ink is in contact with, including the re-imageable surface and the dampening solution as well as with the various subsystems used during the printing process to enable high quality digital printing at high speed.

For example, an inker subsystem may be used to apply a uniform layer of ink over the layer of dampening fluid. The inker subsystem may use an anilox roller to meter the ink onto one or more ink forming rollers that are in contact with the re-imageable surface. The ink used with this subsystem should have a viscosity that is not so high that anilox-take up and delivery to the re-imageable surface is difficult. However, too low of a viscosity, tack and/or poor cohesion may result in the ink crawling out of the ink loader, resulting in unwanted spills, loss of ink and potential contamination of the printer. Accordingly, digital offset inks should have a certain range of viscosity, tack and tack stability to afford sufficient and predictable ink cohesion to enable good transfer properties in and among the various subsystems.

U.S. patent application Ser. No. 15/262,809, which is hereby incorporated by reference herein in its entirety, describes in the Abstract thereof an ink composition useful for digital offset printing applications which includes a colorant and a high viscosity thickening agent. The ink is formulated to incorporate a gellant into the ink set to help meet the requirement of two different viscosity or temperature pairs at two different stages of the ink delivery process. In lithography imaging a bulk ink is first transferred onto an anilox roll and then onto the imaging cylinder blanket. The first transfer from bulk ink to anilox roll requires the ink to have a low viscosity while the transfer from roll to imaging blanket requires a high viscosity. The addition of the gellant will increase the viscosity difference within the allowable temperature range thus increasing process latitude and robustness.

U.S. patent application Ser. No. 15/262,871, which is hereby incorporated by reference herein in its entirety, describes in the Abstract thereof an ink composition useful for digital offset printing applications which includes a colorant and a high viscosity thickening agent. The ink is formulated to incorporate polyester viscosity modifier to help meet the requirement of two different viscosity or temperature pairs at two different stages of the process. In digital offset printing a bulk ink is first transferred onto an anilox roll, and then from the anilox roll onto the imaging cylinder blanket. During the bulk ink to anilox roll the disclosed ink has a low viscosity while the transfer from roll to imaging blanket the ink has a higher viscosity. The addition of the polyester viscosity modifier increases the viscosity difference within the allowable temperature range, thus, increasing process latitude and robustness.

Digital offset printing architectures require offset type inks that are specifically designed and optimized to be compatible with the different subsystems, including ink delivery system and imaging system, that enable high quality printing at high speed with no residual.

Digital offset printing inks differ from conventional inks because they must meet demanding rheological requirements imposed by the lithographic printing process while being compatible with system component materials and meeting the functional requirements of sub-system components, including wetting and transfer. Print process studies have demonstrated that higher viscosity is preferred for ink transfer to digital lithography imaging blanket from the inker unit via a roll and yet even higher viscosity is needed to improve transfer to a print substrate. Therefore, there remains a need for digital advanced lithography imaging inks to have increased viscosity latitude to enable excellent ink transfer from the ink loader system at both about 60° C. and excellent ink delivery from the anilox roller to the fluorosilicone blanket at temperatures as low as about 20° C.

Previous ink compositions for digital offset printing applications required curable monomers, were low viscosity, or required significant water evaporation.

U.S. Pat. No. 9,644,105, which is hereby incorporated by reference herein in its entirety, describes in the Abstract thereof an ink composition or ink concentrate for variable data lithographic printing or ink jet printing includes a nanoparticle polymer or blend of nanoparticle polymers, wherein the polymer or polymers of the blend are water dispersible at temperatures below 100 degrees Celsius; and solids content is in an amount of greater than 25 percent by total weight.

An exemplary digital offset printing architecture is shown in FIG. 1. As seen in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate or a belt, or another now known or later developed configuration. The re-imageable surface 110(a) may be formed of materials including, for example, a class of materials commonly referred to as silicones, including flurosilicone, among others. The re-imageable surface may be formed of a relatively thin layer over a mounting layer, a thickness of the relatively thin layer being selected to balance printing or marking performance, durability and manufacturability.

U.S. patent application Ser. No. 13/095,714 ("714 application"), entitled "Variable Data Lithography System," filed on Apr. 27, 2011, by Timothy Stowe et al., which is commonly assigned, and the disclosure of which is hereby incorporated by reference herein in its entirety, depicts details of the imaging member 110 including the imaging member 110 being comprised of a re-imageable surface layer 110(a) formed over a structural mounting layer that may be, for example, a cylindrical core, or one or more structural layers over a cylindrical core.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 includes, but is not limited to, any particular composition or form such as, for example, paper, plastic, folded paperboard, Kraft paper, clear substrates, metallic substrates or labels. The exemplary system 100 may be used for producing images on a wide variety of image receiving media substrates. The 714 application also explains the wide latitude of marking (printing) materials that may be used.

The exemplary system 100 includes a dampening fluid system 120 generally comprising a series of rollers, which may be considered as dampening rollers or a dampening unit, for uniformly wetting the re-imageable surface of the imaging member 110 with dampening fluid. A purpose of the dampening fluid system 120 is to deliver a layer of dampening fluid, generally having a uniform and controlled thickness, to the re-imageable surface of the imaging member 110. It is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane.), and D4 (octamethylcyclotetrasiloxane). Other suitable dampening fluids are disclosed, by way of example, in co-pending U.S. Pat. No. 9,592,699, the disclosure of which is hereby incorporated herein by reference in its entirety.

Once the dampening fluid is metered onto the re-imageable surface of the imaging member 110, a thickness of the dampening fluid may be measured using a sensor (not shown) that may provide feedback to control the metering of the dampening fluid onto the re-imageable surface of the imaging member 110 by the dampening fluid system 120.

After a precise and uniform amount of dampening fluid is provided by the dampening fluid system 120 on the re-imageable surface of the imaging member 110, an optical patterning subsystem 130 may be used to selectively form a latent image in the uniform dampening fluid layer by imagewise patterning the dampening fluid layer using, for example, laser energy. Typically, the dampening fluid will not absorb the optical energy (IR or visible) efficiently. The re-imageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the re-imageable surface of the imaging member 110 is presented to an inker subsystem 140. The inker subsystem 140 is used to apply a uniform layer of ink over the layer of dampening fluid and the re-imageable surface layer of the imaging member 110. The inker subsystem 140 may use an anilox roller to meter an offset lithographic ink, such as the white ink compositions of the present disclosure, onto one or more ink forming rollers that are in contact with the re-imageable surface layer of the imaging member 110. Separately, the inker subsystem 140 may include other traditional elements such as a series of metering rollers to provide a precise feed rate of ink to the re-imageable surface. The inker subsystem 140 may deposit the ink to the pockets representing the imaged portions of the re-imageable surface, while ink on the unformatted portions of the dampening fluid will not adhere to those portions.

The cohesiveness and viscosity of the ink residing in the re-imageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the re-imageable surface to, for example, increase ink cohesive strength relative to the re-imageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the re-imageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the re-imageable surface of the imaging member 110 is brought into physical contact with the substrate 114. With the adhesion of the ink, such as the white ink of the present disclosure, having been modified by the rheology control system 150, modified adhesion of the ink causes the ink to adhere to the substrate 114 and to separate from the re-imageable surface of the imaging member 110. Careful control of the temperature and pressure conditions at the transfer nip 112 may allow transfer efficiencies for the ink, such as the white ink of the present disclosure, from the re-imageable surface of the imaging member 110 to the substrate 114 to exceed 95%. While it is possible that some dampening fluid may also wet substrate 114, the volume of such a dampening fluid may be minimal, and may rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid may be removed from the re-imageable surface of the imaging member 110, typically without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 application describes details of such a cleaning subsystem 170 including at least a first cleaning member such as a sticky or tacky member in physical contact with the re-imageable surface of the imaging member 110, the sticky or tacky member removing residual ink and any remaining small amounts of surfactant compounds from the dampening fluid of the re-imageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 application details other mechanisms by which cleaning of the re-imageable surface of the imaging member 110 may be facilitated. Regardless of the cleaning mechanism, however, cleaning of the residual ink and dampening fluid from the re-imageable surface of the imaging member 110 may be used to prevent ghosting in the system. Once cleaned, the re-imageable surface of the imaging member 110 is again presented to the dampening fluid system 120 by which a fresh layer of dampening fluid is supplied to the re-imageable surface of the imaging member 110, and the process is repeated.

While currently available ink compositions may be suitable for their intended purposes, a need remains for improved digital offset printing inks, in particular, digital offset printing inks that are free of curable monomers, for example ultra-violet (UV) curable monomers, where the risk of migration of UV ink components limits the use of such UV inks for applications such as food packaging. Further a need remains for digital offset printing inks exhibiting desirable inking from the anilox delivery system, wetting to the blanket substrate, and blanket transfer to the print substrate (for example paper or film). What is further needed is an ink composition suitable for digital offset printing where the ink composition is optically clear. Pigment can be a major component of conventional UV curable digital offset ink, comprising, for example, from about 15 to about 20 weight percent of the curable ink composition. Many typical thickening agents are particulate in nature, such as silicas, clays, and other particle-based fillers. Many of these options are not compatible for meeting the performance requirements of digital offset ink compositions such as meeting the desired inking and transfer properties, and do not allow an ink composition having a desired level of clarity. Thus, there is a need for clear, non-pigmented waterborne ink compositions suitable for digital offset ink applications including for expanded print processes, such as printing on colored substrates.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous ink composition comprising water; an optional co-solvent; a sulfonated polyester, wherein the sulfonated polyester has a degree of sulfonation of at least about 3.5 mol percent; and an isoprene rubber.

Also described is a process of digital offset printing, the process comprising applying an ink composition onto a re-imageable imaging member surface at an ink take up temperature, the re-imageable imaging member having dampening fluid disposed thereon; forming an ink image; transferring the ink image from the re-imageable surface of the imaging member to a printable substrate at an ink transfer temperature; wherein the ink composition comprises water; an optional co-solvent; a sulfonated polyester, wherein the sulfonated polyester has a degree of sulfonation of at least about 3.5 mol percent; and an isoprene rubber.

Also described is a process comprising combining a sulfonated polyester resin, wherein the sulfonated polyester has a degree of sulfonation of at least about 3.5 mol percent, water, an optional co-solvent, and an isoprene rubber to form an aqueous ink composition, wherein the ink composition is substantially colorless.

DETAILED DESCRIPTION

An ink composition particularly suitable for digital offset printing is described comprising an aqueous ink composition comprising water; an optional co-solvent; a sulfonated polyester, wherein the sulfonated polyester has a degree of sulfonation of at least about 3.5 mol percent; and an isoprene rubber.

In embodiments, the ink compositions achieve 100% transfer from a transfer substrate. In embodiments, the ink compositions achieve 100% transfer on a digital offset printing fixture for waterborne ink directly, without the requirement of partially curing the ink. The ink compositions include, in embodiments, colorant-free ink compositions comprising water-dissipatible sulfopolyester materials for the polymer matrix, rubber elastomer, in embodiments, polyisoprene, wherein the ink composition can achieve substantially 100 percent ink transfer from the central imagining cylinder in the absence of pigment.

The ink compositions can be used for any suitable or desired purpose. In embodiments, the ink compositions herein are particularly suitable for digital offset printing, in embodiments, for printing labels, packaging, and in particular for food grade and medical grade printing. In embodiments, the ink herein is suitable for use as an over coat or an undercoat in a printing process. The digital offset ink herein containing the particular combination of components, in embodiments, a combination of sulfonated polyester and rubber, while being substantially free of colorant, provides improved transfer performance over prior digital offset ink compositions.

In embodiments, waterborne, clear, non-pigmented ink compositions are provided containing a particular combination of self-dispersing sulfonated polyester particles and polyisoprene rubber latex emulsion which provide desired inking and release properties. The ink compositions herein provide good inking from an anilox delivery system, good wetting to a blanket substrate, and good transfer from the blanket to the print substrate, such as paper or film.

The waterborne digital offset ink compositions comprise, in embodiments, a colorant-free ink including self-dispersing sulfonated polyester particles and polyisoprene rubber latex emulsion, which provide desired inking and release properties, compatibility with non-aqueous fountain fluids, and function within the ink delivery system (anilox roll). The ink compositions demonstrate good inking from the anilox delivery system, wetting to the blanket substrate, and blanker transfer to the print substrate. The ink compositions demonstrate substantially 100 percent transfer on a digital offset printing fixture. It is believed that the present ink compositions demonstrate for the first time 100 percent transfer on a digital offset printing fixture for clear waterborne ink directly without the requirement of partially curing the ink.

In embodiments, a fast, inexpensive, and efficient water-based digital offset process is provided with a clear ink.

Figure 1:
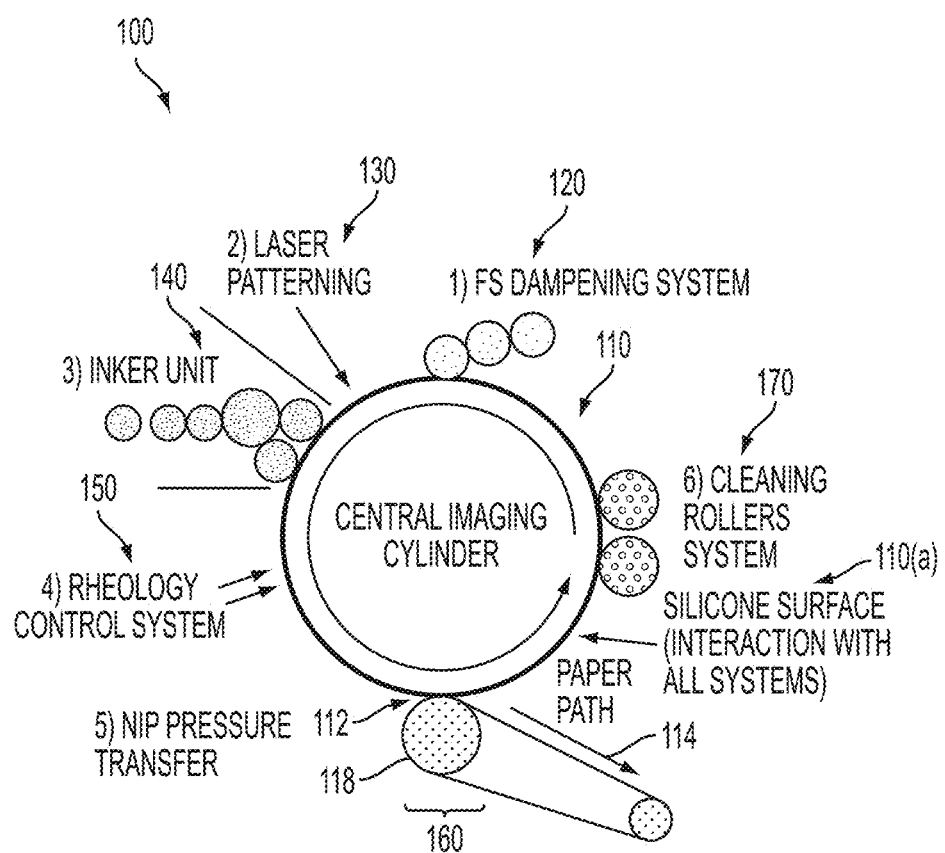
FIG. 1 illustrates a schematic representation of a related art ink-based variable image digital printing system with which the ink compositions according to this disclosure may be used.

As described in FIG. 1, it is highly advantageous to ensure inking uniformity and delivery of the ink from the ink loader system (or inker unit) and that the ink has relatively low viscosity within a temperature range of, in embodiments, from about 45 to about 80° C., such as from about 50 to about 70° C., such as from about 55 to about 65° C., such as about 60° C., at shear rates corresponding to the equivalent angular frequencies from about 50 to about 200 rad/s such as about 100 rad/s. It is also highly advantageous to ensure a high degree of ink transfer from the anilox roller to the blanket such that the ink has relatively high viscosity within a temperature range of, in embodiments, from about 18 to about 35° C., such as from about 18 to about 30° C., such as about 25° C., at shear rates corresponding to the equivalent angular frequencies from about 0.5 to about 2 rad/s such as about 1 rad/s.

In embodiments, the ink composition has a first viscosity of from about 3,000 to about 90,000 centipoise at an ink take up temperature of from about 45° C. to about 80° C.; and the ink composition has a second viscosity of from about 100,000 to about 2,000,000 centipoise at an ink transfer temperature of from about 18° C. to about 30° C.

In embodiments, the ink composition has a first viscosity of from about 3,000 to about 90,000 centipoise at an ink take up temperature of from about 45° C. to about 80° C. and a relatively higher shear rate of from about 50 rad/s to about 200 rad/s; and the ink composition has a second viscosity of from about 100,000 to about 2,000,000 centipoise at an ink transfer temperature of from about 18° C. to about 30° C. and a relatively lower angular frequency of from about 0.5 rad/s to about 2 rad/s.

In order to meet digital offset printing requirements, the ink desirably possesses many physical and chemical properties. The ink is desirably compatible with materials it is in contact with, including printing plate, fountain solution, and other cured or non-cured inks. It also desirably meets functional requirements of the sub-systems, including wetting and transfer properties. Transfer of the imaged inks is challenging, as the ink desirably possesses the combination of wetting and transfer traits, that is, the ink desirably at once wets the blanket material homogeneously, and transfers from the blanket to the substrate. Transfer of the image layer is desirably efficient, desirably at least as high as 90%, as the cleaning sub-station can only eliminate small amounts of residual ink. Any ink remaining on the blanket after cleaning can result in an unacceptable ghost image appearing in subsequent prints.

In embodiments, the ink composition herein has the characteristic of providing substantially 100 percent transfer from the re-imageable imaging member surface to the printable substrate.

The ink composition includes a sulfonated polyester. In embodiments, the sulfonated polyester has a high degree of sulfonation, in embodiments, the sulfonated polyester has a degree of sulfonation of at least about 3.5 mol percent, at least about 4 mol percent, at least about 7 mol percent, or at least about 7.5 mol percent.

In embodiments, the sulfonated polyester is a sodium sulfonated polyester having a high degree of sulfonation. In embodiments, the sodium sulfonated polyester has a degree of sulfonation of at least about 3.5 mol percent, at least about 4 mol percent, at least about 7 mol percent, at least about 7.5 mol percent, at least about 10 mol percent, at least about 15 mol percent, or at least about 20 mol percent. In embodiments, the sodium sulfonated polyester has a degree of sulfonation of from at least about 3.5 mol percent to about 20 mol percent, or from at least about 3.5 mol percent to about 15 mol percent, or from at least about 3.5 mol percent to about 10 mol percent. In embodiments, the sodium sulfonated polyester has a degree of sulfonation of from at least about 3.5 mol percent to about 7.5 mol percent. In other embodiments, the sodium sulfonated polyester has a degree of sulfonation of from at least about 4 mol percent to about 5.5 mol percent. In certain other embodiments, the sodium sulfonated polyester has a degree of sulfonation of from at least about 7.0 mol percent to about 7.5 mol percent. In certain other embodiments, the sodium sulfonated polyester has a degree of sulfonation of from at least about 7.5 mol percent to about 10 mol percent.

As used herein, mol percent refers, for example, to the percentage of moles of sulfonated monomer present in the final resin and can be calculated, for example, as (moles DMSIP (Dimethyl-5-Sulfoisophthalate Sodium Salt) charged/(total moles charged less excess moles glycol)×100 percent).

In embodiments, the polymer is made from a 1:1 ratio of total diacid and total diol. There an excess of glycol in the formulation that gets removed (distilled) during the reaction. The following calculation example can be used to determine mol percent sulfonation.

% Mole of sodio=(moles of ISPT)/2(moles of ISPT+ moles of DMT)

TABLE 1

|  | Mw | Mass | Moles | % Mole |
|---|---|---|---|---|
| DMT | 194.19 | 388 | 1.998043 |  |
| ISPT | 296.23 | 44 | 0.148533 | 3.459771 |
| PG | 76 | 302 | 3.973684 |  |
| DEG | 106 | 34 | 0.320755 |  |
| TMP | 134 | 3 | 0.022388 |  |
|  |  |  | 6.463403 |  | wherein DMT is dimethyl terephthalate;
ISPT is sodium 5-sulfoisophthalic acid;
PG is polyethylene glycol;
DEG is diethylene glycol; and
TMP is trimethylolpropane.

The sulfonated polyester is a self-dissipatible polymer, meaning that it can be dispersed in water without the need for additional surfactants.

Figure 2:
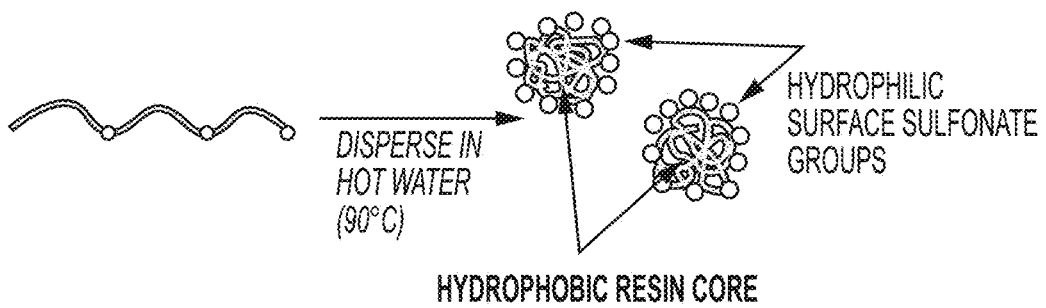
FIG. 2 shows a schematic representation of a method for preparing sulfonated polyester latex materials.
Figure 3:
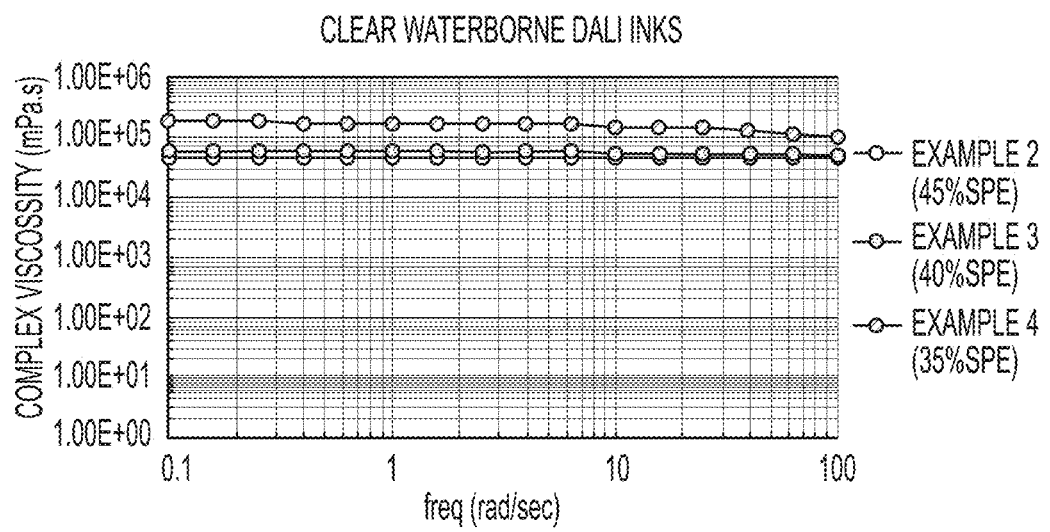
FIG. 3 is a graph showing complex viscosity (y-axis, mPas) versus frequency (x-axis, rad/sec) for ink compositions in accordance with the present embodiments.

The sulfonated polyester can be simultaneously synthesized during the self-assembly or dispersing of polymer in water as indicated in FIG. 2. Referring to FIG. 2, the sulfonated polyester is dispersed in water, for example at a temperature of about 90° C., providing a hydrophobic resin core and hydrophilic surface sulfonate groups.

The sulfonated polyester resins disclosed herein have been selected to have a hydrophobic backbone while presenting hydrophilic sulfonate groups attached along the chain. Without being bound by theory, when placed in water and heated, the hydrophobic portions may interact with each other to form a hydrophobic core with the hydrophilic sulfonate groups facing the surrounding water resulting in the sulfonated polyester self-assembling into a higher order, spherical nanoparticle without the requirement of additional reagents, such as surfactants or dispersants, which are typically required to stabilize colloidal dispersions. Thus, there is a higher order involving the amphiphilic polyester, in which the hydrophobic backbone, which is insoluble in water, and the water-soluble hydrophilic sulfonate groups, operate as macrosurfactants. This results in self-association, self-assembly, self-dispersible nanoparticles in aqueous medium to yield micelle-like aggregates.

In embodiments, the sulfopolyester materials are copolymers containing a blend of polyethylene terephthalate (PET) and sulfonated isophthalate moieties. The colloidal latex dispersions that are prepared in hot water enable moderately high percent solids.

In embodiments, the sulfonated polyester matrix is a branched polymer. In embodiments, the sulfonated polyester matrix is a linear polymer. The selection of branched or linear polymer may depend on, inter alia, the downstream application of the composite product. Linear polymers can be used to create strands of fibers or form a strong mesh-like structure. Branched polymers may be useful to confer thermoplastic properties on the resultant composite material.

Both linear amorphous and branched amorphous sulfonated polyester resins are alkali sulfonated polyester resins. The alkali metal in the respective sulfonated polyester resins may independently be lithium, sodium, or potassium. In a specific embodiment, the alkali metal in the respective sulfonated polyester resin is sodium.

In embodiments, the sulfonated polyester matrix is selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate). Thus, in embodiments, the sulfonated polyester matrix is lithium, potassium, or sodium salt, in specific embodiments, a sodium salt, of a polymer selected from the group consisting of poly(1,2-propylene-5-sulfoisophthalate), poly (neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly (propoxylated bisphenol A)-copoly-(propoxylated bisphenol A-5-sulfoisophthalate).

In general, the sulfonated polyesters may have the following general structure, or random copolymers thereof in which the n and p segments are separated.

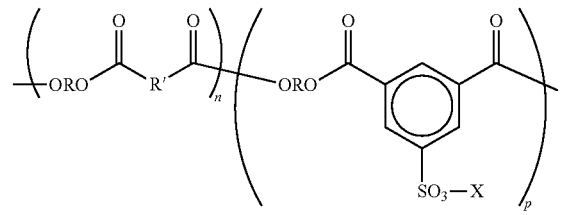

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; and p and n represent the number of randomly repeating segments, such as for example from about 10 to about 100,000.

In embodiments, the sulfonated polyester is a sodium sulfonated polyester having the structure

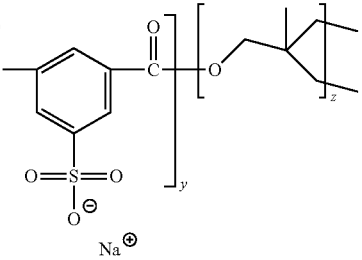

wherein R is an alkylene of, for example, from 2 to about 25 carbon atoms such as ethylene, propylene, butylene, oxyalkylene diethyleneoxide, and the like; $R_1$ is an alkylene of, for example, from 2 to about 25 carbon atoms such as ethylene, propylene, butylene, oxyalkylene diethyleneoxide, and the like; or an arylene of, for example, from about 6 to about 36 carbon atoms, such as a benzylene, bisphenylene, bis(alkyloxy) bisphenolene, and the like;

or wherein, in embodiments, R and $R_1$ are each an alkyene of, for example, from about 2 to about 10 carbon atoms; and x, y and z represent the number of randomly repeating segments, such as for example from about 10 to about 100,000, wherein, in embodiments, y is from about 3.5 mol percent, or greater than about 3.5 mol percent, or from at least about 3.5 mol percent to about 20 mol percent, or from at least about 3.5 mol percent to about 15 mol percent, or from at least about 3.5 mol percent to about 10 mol percent of the resin; or wherein, in embodiments, y is from about 7.5 mol percent, or greater than about 7.5 mol percent, or from at least about 7.5 mol percent to about 20 mol percent, or from at least about 3.5 mol percent to about 15 mol percent, or from at least about 7.5 mol percent to about 10 mol percent of the resin; or wherein R is aliphatic having from about 2 to about 10 carbon atoms and $R_1$ is aliphatic having from about 2 to about 10 carbon atoms; where y is from about 3 to about 7.5 percent. Higher than 7.5 percent is usually water soluble.

Examples further include those disclosed in U.S. Pat. No. 7,312,011 which is hereby incorporated by reference herein in its entirety. Specific examples of amorphous alkali sulfonated polyester based resins include, but are not limited to, copoly(ethylene-terephthalate)-copoly-(ethylene-5-sulfo-isophthalate), copoly(propylene-terephthalate)-copoly (propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion. Examples of crystalline alkali sulfonated polyester based resins include, but are not limited to, alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly (hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly (propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly (butylene-adipate), alkali copoly(5-sulfo-isophthaloyl)-copoly(pentylene-adipate), alkali copoly(5-sulfo-isophthaloyl)copoly(hexylene-adipate), poly(octylene-adipate), and wherein the alkali is a metal such as sodium, lithium or potassium. In specific embodiments, the alkali metal is sodium.

The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

Examples of diacid or diesters selected for the preparation of amorphous polyesters include dicarboxylic acids or diesters selected from the group consisting of terephthalic acid, phthalic acid, isophthalic acid, sulfonated isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester are selected, for example, from about 45 to about 52 mole percent of the resin. Examples of diols utilized in generating the amorphous polyester include trimethylolpropane, 1,2-propanediol, 1,3-propanediol, 1,2-butanediol, 1,3-butanediol, 1,4-butanediol, pentanediol, hexanediol, 2,2- dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected can vary, and more specifically, is, for example, from about 45 to about 52 mole percent of the resin. In embodiments, the sulfonated polyester matrix comprises a polyol monomer unit selected from the group consisting of trimethylolpropane, 1,2-propanediol, diethylene glycol, and combinations thereof. In embodiments, the sulfonated polyester matrix comprises a polyol monomer unit selected from the group consisting of trimethylolpropane, 1,2-propanediol, diethylene glycol, and combinations thereof.

Alkali sulfonated difunctional monomer examples, wherein the alkali is lithium, sodium, or potassium, and in particular embodiments wherein the alkali is sodium, include dimethyl-5-sulfo-isophthalate, dialkyl-5-sulfo-isophthalate-4-sulfo-1,8-naphthalic anhydride, 4-sulfophthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof, and the like. Effective difunctional monomer amounts of, for example, from about 0.1 to about 2 weight percent of the resin can be selected.

Branching agents for use in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Polycondensation catalyst examples for amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

As used herein, references to "particle size" will generally refer to D50 mass-median-diameter (MMD) or the log-normal distribution mass median diameter. The MMD is considered to be the average particle diameter by mass.

In embodiments, the polyester has a particle size in a range of from about 5 nanometers (nm) to about 500 nm or from about 10 to about 200 nm, or from about 20 to about 100 nm. A particle size of less than 100 nm may be useful for reinforcement of polymer matrices without disturbing transparency and other properties of coatings.

In embodiments, the polyester has a particle size of from about 5 nanometers to about 55 nanometers. In further embodiments, the polyester has a particle size of from about 10 nanometers to about 15 nanometers.

In embodiments, there are provided methods comprising heating a sulfonated polyester resin in water, thereby forming an emulsion of composite particles comprising a sulfonated polyester.

In embodiments, heating is conducted at a temperature of from about 65° C. to about 90° C.

In certain embodiments, a method herein comprises heating a sulfonated polyester resin in water, in embodiments a sulfonated polyester resin, wherein the sodium sulfonated polyester has a degree of sulfonation of at least about 3.5 mol percent, or at least about 7.5 mol percent; and forming an emulsion of particles comprising the sulfonated polyester. In embodiments, the method further comprises combining the polyester particles with water, an optional co-solvent, and an isoprene rubber to form an aqueous ink composition.

In embodiments, the sulfonated polyester can be present in the ink composition in any suitable or desired amount. In embodiments, the sulfonated polyester is present in the ink composition in an amount of from about 30 to about 50 percent, or from about 35 to about 45 percent, by weight based upon the total weight of the ink composition.

In certain embodiments, the sulfonated polyester has a degree of sulfonation of at least about 3.5 mol percent, or at least about 7.5 mol percent, and this highly sulfonated polyester is present in the ink composition in an amount of from about 30 to about 50 percent, or from about 35 to about 45 percent, by weight based upon the total weight of the ink composition.

In embodiments, the ink compositions comprise an isoprene rubber. Any suitable or desired isoprene rubber can be selected. The isoprene rubber can be provided in the form of a rubber latex emulsion.

In embodiments, the isoprene rubber comprises cis-polyisoprene. The cis-configuration of the polyisoprene is believed to provide an elastic property to the ink composition which imparts increased cohesion to the ink. In embodiments, the isoprene rubber comprises cis-polyisoprene of the formula

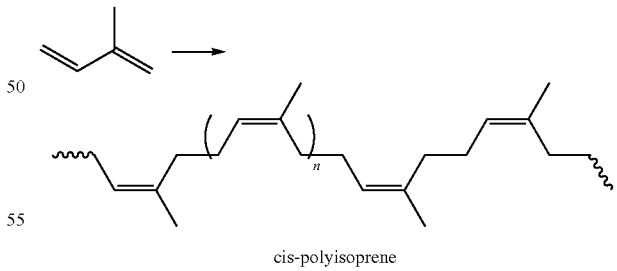

cis-polyisoprene wherein n is from about 1,400 to about 15,000.

In embodiments, wherein Mw is from 100,000 to 1,000,000, and the unit Mw is 68.12, n is from 1,467 to 14,669.

In embodiments, the isoprene rubber comprises a copolymer comprising a member of the group consisting of styrene-butadiene, styrene-isoprene, isoprene, and combinations thereof.

Cariflex™ is the tradename for a class of styrene/butadiene (SBS), styrene/isoprene (SIS), and isoprene rubber (IR)

copolymers available from Kraton™ Corporation. The cis-configuration of the polyisoprene provides an elastic property to the described ink formulations, which imparts more cohesion to the ink. It is available as an aqueous latex emulsion, enabling incorporation into waterborne inks. Moreover, Kraton™ polymer segment products are used as components in food packaging applications and meet the exemption for "food contact substances." In embodiments, the polyisoprene can be Cariflex™ IR040SU isoprene rubber dispersion, available from Kraton™ Corporation.

The isoprene rubber can be present in the ink composition in any suitable or desired amount. In embodiments, the isoprene rubber is present in the ink composition in an amount of from about 1.5 to about 6.5 percent, or from about 1.5 to about 6.6 percent, by weight based upon the total weight of the ink composition. In embodiments, where a latex is provided as a 30 weight percent latex dispersion in water, 5%×0.30=1.5% and 20%×0.3=6%.

In other embodiments, the isoprene rubber is present in the ink composition in an amount of from about 1.5 to about 3 percent by weight based upon the total weight of the ink composition.

In certain embodiments, the isoprene rubber is present in the ink composition in an amount of from about 2 to about 10 percent, or from about 3 to about 7 percent, or about 5 percent by weight based upon the total weight of the ink composition.

The ink can be used in any suitable or desired printing application. The ink herein is particularly useful for indirect printing applications wherein the ink wets the intermediate receiving member enabling formation of a transient image on the intermediate receiving followed by release from the intermediate receiving member in the transfer printing step. In embodiments, the ink undergoes partial or complete drying while on the intermediate transfer member.

Ink compositions herein specifically suitable for indirect printing systems, are also compatible with different printing subsystems including jetting and transfer subsystems, and enable high quality printing at high speed. In embodiments, ink compositions herein enable and perform well in both wetting and transfer subsystems, displaying both acceptable wettability characteristics in combination with acceptable release and transfer characteristics.

The ink compositions herein can consist solely of water, or can comprise a mixture of water and a water soluble or water miscible component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidinone, methoxylated glycerol, ethoxylated glycerol, and mixtures thereof.

When mixtures of water and water soluble or miscible organic solvent liquids are selected as the liquid vehicle, the water to organic co-solvent ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The co-solvent selected is one that will mix with water without phase separation; thus, a co-solvent having a polarity that is compatible with water is selected. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 60 to about 70% of the ink composition. Thus, the ink compositions herein are mainly aqueous.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the ink composition in an amount of from about 75 to about 97 percent, or from about 80 to about 95 percent, or from about 85 to about 95 percent, by weight, based on the total weight of the ink composition.

In embodiments, the ink compositions herein are substantially colorless. As used herein, "substantially colorless" refers to the ink composition being substantially or completely transparent or clear prior to and after undergoing drying. For this, the composition may be substantially free of colorants, in embodiments, substantially free of dye or pigment. The ink composition herein does not yellow upon drying and remains substantially or completely transparent and clear; that is, little or no measurable difference in any of L*a*b* values, or k, c, m, y is observed. Being "substantially non-yellowing" or "substantially or completely transparent or clear" refers to the ink compositions changing color or hue upon curing in an amount of less that about 15 percent, or less than about 10 percent, or less than about 5 percent, for example, about zero percent.

In embodiments, the ink composition is substantially or completely free of colorants, such as pigments, dyes, or mixtures thereof.

In embodiments, the ink composition may include a small amount of colorant sufficient to provide a clear tinted ink. In these embodiments, the colorant is selected in a small amount suitable to impart the desired tint while maintaining the clarity of the ink composition and while not adversely affecting the ink viscosity, wetting, or transfer properties. In embodiments, the ink composition is substantially colorless or is a tinted clear ink upon printing.

If a small amount of colorant is included to provide a clear, tinted ink, the colorant can be selected from any suitable or desired colorant including pigments, dyes, dye dispersions, pigments dispersions, and mixtures and combinations thereof.

The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza (18)annulenes, formazan copper complexes, triphenodioxazines, and the like; as well as mixtures thereof.

Examples of suitable pigments include black pigments, white pigments, cyan pigments, magenta pigments, yellow pigments, and the like. Further, pigments can be organic or inorganic particles. Suitable inorganic pigments include carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH®® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET 300, REGAL, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW S160, FW S170, Special Black 6, Special Black 5, Special Black 4A, Special Black 4, PRINTEX® U, PRINTEX® 140U, PRINTEX® V, and PRINTEX® 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA210™ IGEPAL CA520™, IGEPAL CA720™, IGEPAL CO-890™, IGEPAL C0-720™, IGEPAL C0-290™, IGEPAL CA-21O™ ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, a process herein comprises combining a sulfonated polyester resin, wherein the sulfonated polyester has a degree of sulfonation of at least about 3.5 mol percent, water, an optional co-solvent, and an isoprene rubber to form an aqueous ink composition, wherein the ink composition is substantially colorless. In embodiments, the process includes wherein the sulfonated polyester has a degree of sulfonation of at least about 7.5 mol percent. In embodiments, the process includes wherein the sulfonated polyester is present in the ink composition in an amount of from about 35 to about 45 percent by weight based upon the total weight of the ink composition.

In embodiments, a method of digital offset printing herein includes applying the ink composition of the present disclosure onto a re-imageable imaging member surface, the re-imageable imaging member having dampening fluid disposed thereon; forming an ink image; and transferring the ink image from the re-imageable surface of the imaging member to a printable substrate. In embodiments, applying the ink composition comprises applying the ink composition using an anilox delivery system.

The ink composition in accordance with the present disclosure is not limited to use in digital offset printing. The ink composition disclosed herein may also be useful in conventional offset printing or hybrid conventional offset and digital offset printing systems. Nonetheless, the ink compositions of the present disclosure meet systems requirements that are unique to digital offset printing systems.

In embodiments, a process of digital offset printing herein comprises applying an ink composition onto a re-imageable imaging member surface at an ink take up temperature, the re-imageable imaging member having dampening fluid disposed thereon; forming an ink image; transferring the ink image from the re-imageable surface of the imaging member to a printable substrate at an ink transfer temperature; wherein the ink composition comprises water; an optional co-solvent; a sulfonated polyester, wherein the sulfonated polyester has a degree of sulfonation of at least about 3.5 mol percent; and an isoprene rubber. In embodiments, the process includes wherein the sulfonated polyester has a degree of sulfonation of at least about 7.5 mol percent. In embodiments, the process includes wherein the sulfonated polyester is present in the ink composition in an amount of from about 35 to about 45 percent by weight based upon the total weight of the ink composition. In embodiments, the process includes wherein the ink composition is substantially colorless.

Any suitable substrate, recording sheet, or removable support, stage, platform, and the like, can be employed for depositing the ink compositions herein, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like. In certain embodiments, the substrate is selected from the group consisting of paper, plastic, folded paperboard, Kraft paper, and metal. In a specific embodiments, the substrate is a label. The label can be selected from any of the aforementioned types of substrate. In embodiments, the substrate comprises food packaging, medicinal packaging, and the like. In certain embodiments, the ink compositions herein form an overcoat, an undercoat, or a combination thereof. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired substrate or three-dimensional substrate. In further embodiments, the substrate comprises customizable digitally printed ID codes, short-run printable materials three-dimensional medical and any other desired three-dimensional substrate.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Highly Sulfonated Polyester Synthesis (7.5 Weight Percent Sulfonation).

A 5 gallon Parr reactor equipped with a mechanical stirrer, distillation apparatus and bottom drain valve was charged with dimethyl terephthalate (3.492 kilograms), dimethyl-5-sulfo-isophthalate sodium salt (940 grams), 1,2-propanediol (2.9 kilograms), diethylene glycol (449 grams) and FAS-CAT® 4100 (7.2 grams). The mixture was heated under nitrogen flow (3 SCFH) to 120° C., after which stirring at 50 rpm (revolutions per minute) was initiated. The mixture was then heated at 0.5° C./minute for the next two hours until a temperature of 180° C. was attained, during which the methanol by-product was collected in the distillation receiver. The mixture was then heated at a rate of 0.25° C., until a temperature of 210° C. was attained, during which both methanol and excess 1,2-propanediol was collected in the distillation receiver. Vacuum was then applied gradually until 4.4 mm-Hg was attained at 210° C. over a 1 hour period. The mixture was then re-pressurized to atmospheric pressure with nitrogen, and the content was discharged through the bottom drain into a container. The product was then allowed to cool to room temperature overnight, followed by granulation using a FitzMill®. The product, displayed an onset glass transition temperature of 55.4° C., number average molecular weight of 1,326 grams/mole, a weight average molecular weight of 2,350 grams/mole, and a softening point of 135.9° C.

Examples 2, 3, and 4

Formulation into Digital Offset Ink.

Examples 2, 3, and 4 having the components as shown in Table 1 were formulated into an ink as follows.

To a 250 milliliter glass beaker was added sulfopolyester, sulfolane and water. The mixture was heated to 90° C. with stirring using an overhead P4 mixing blade at 300 rpm. Next, the mixture was transferred to a 250 milliliter water-cooled stainless steel tank and stirred with a Cowles blade and finally the Cariflex™ latex was gradually added. All three clear ink compositions were further characterized via viscosity. Figure X shows complex viscosity (y-axis, mPas) versus frequency (x-axis, rad/sec) for the inks of Examples 2 (45% SPE), 3 (40% SPE), and 4 (35% SPE). At polymer loadings between 35 and 45% solids, the resultant clear ink compositions were in the correct viscosity ranges for digital offset inks. Thus, in embodiments, an ink composition herein contains a polymer loading of from about 35 to about 45 weight percent, based on the total weight of the ink composition.

TABLE 1

| | Example | | | | | |
|---|---|---|---|---|---|---|
| | 2 | | 3 | | 4 | |
| | Weight Percent | Mass (grams) | Weight Percent | Mass (grams) | Weight Percent | Mass (grams) |
| SPE-Example 1 | 45.0 | 45 | 40 | 50 | 35 | 55.09 |
| Sulfolane | 20 | 20 | 20 | 25 | 20 | 31.48 |
| Water | 30 | 30 | 35 | 43.75 | 40 | 62.96 |
| Cariflex ™ IR040SU | 5 | 5 | 5 | 6.25 | 5 | 7.87 |
| TOTAL | 100 | 100 | 100 | 125 | 100 | 157.4 |

Cariflex™ IR040SU isoprene rubber dispersion, available from Kraton™ Corporation, comprises about 63 to about 65 percent solids in water.

Testing of Clear Inks Containing Polyisoprene on Lithographic Print Fixture.

Ink Examples 3 and 4 were tested on a digital offset print testing fixture to evaluate the efficiency of ink transfer from the blanket under typical lithographic print conditions. An anilox roll was filled with ink, transferred to the blanket, then offset pressed onto coated paper, followed by a second and third offset event between fresh paper and the previously inked blanket to monitor the residual ink that may remain on the blanket ('chase sheet'). The inks were also tested on black paper to enable viewing of the clear ink film.

Figure 4:
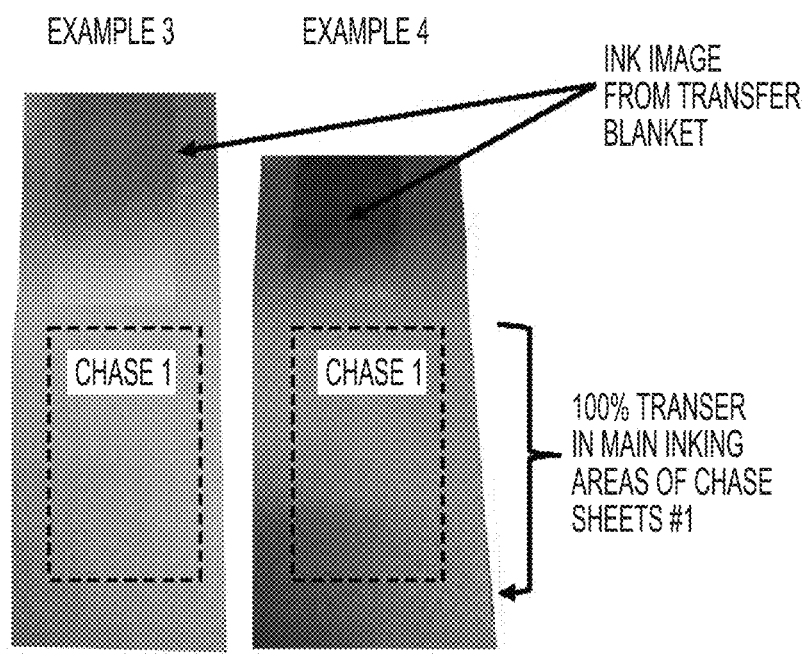
FIG. 4 is an image illustrating offset printing results for ink compositions in accordance with the present embodiments.

FIG. 4 shows the offset printing results for Examples 3 and 4. The black paper transfer sheets show the ink used directly at 0.5 meter/second demonstrated 100% transfer from the blanket to paper, without any evidence of residual ink on the 1st chase sheets. It is noted that transfer this complete, at 100%, has not been observed for UV inks using this fixture with bare blanket; these aqueous formulations display the highest transfer performance yet observed by our screening processes.

Robustness Testing.

Dried prints on coated paper were prepared with the inks of Examples 2, 3, and 4 and subjected to robustness testing.

The prints were robust to a tape test, where Scotch™ tape was applied with pressure to the print surface and removed cleanly.

The prints were robust to a water swab test, where a cotton swab was dipped in water and rubbed with pressure across the print surface 10 times, without removal of any ink.

In embodiments, sulfopolyesters having a high, 7.5 percent sulfonation are employed, enabling higher solids loading, and smaller particle domains (50 nanometers or less). This increased solids loading of higher sulfonation level SPE polymer allows increased polymer concentration, and enables creation of thick offset inks with good transfer properties. Simply removing the pigment from a waterborne digital offset ink would yield a very watery ink with poor transfer and cohesion. Previous sulfonated polyester having less than 3.5 percent sulfonation resulted in, beyond a certain concentration, a solubility limit, and particle domains in the 100 nanometer regime.

Thus, waterborne clear digital offset ink compositions containing highly sulfonated (>3.5% sulfonation) polyester and polyisoprene additive are provided. The ink compositions are believed to be the first waterborne clear ink compositions demonstrating complete transfer from a digital offset blanket.

High viscosity ink compositions are realized in a non-pigmented clear ink composition. In embodiments, the high viscosity clear ink compositions are enabled by use of a sulfonated polyester containing greater than 3.5 percent sulfonation and a polymer loading of from about 35 to about 45 weights percent. In embodiments, a waterborne rubber emulsion is combined with a sulfo-polyester nanoparticle in an aqueous ink composition which provides substantially complete transfer rather than splitting of lithographic ink experienced by prior compositions.

In embodiments, the digital offset printing inks are free of (that is, do not contain) curable monomers, for example ultra-violet (UV) curable monomers. The non-pigmented, aqueous digital offset ink compositions can be used for any suitable or desired printing application, and are particularly suitable for expanded market applications including, but not limited to, food labels, colored substrates, special effects such as digital gloss, packaging, among others.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink composition comprising:
    water;
    an optional co-solvent;
    a sulfonated polyester, wherein the sulfonated polyester has a degree of sulfonation of at least about 7.5 mol percent;
    wherein the sulfonated polyester is of the formula:

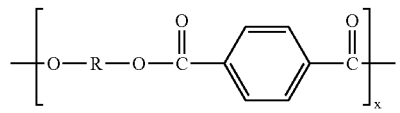

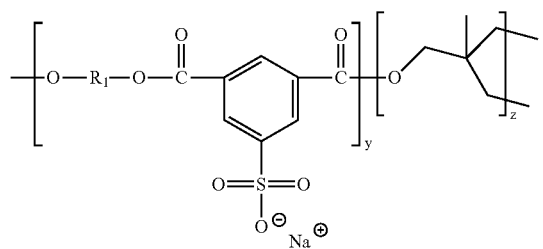

wherein R is an alkylene of from 2 to about 25 carbon atoms;
wherein $R_1$ is wherein R is an alkylene of from 2 to about 25 carbon atoms;
wherein x is from about 10 to about 100,000;
wherein y is about 7.5 mol percent;
wherein z is from about 10 to about 100,000; and
an isoprene rubber;
wherein the aqueous ink composition has a first viscosity of from about 3,000 to about 90,000 centipoise at an ink take up temperature of from about 45° C. to about 80° C. and a second viscosity of from about 100,000 to about 2,000,000 centipoise at an ink transfer temperature of from about 18° C. to about 30° C.; and
wherein the ink composition is substantially colorless or is a tinted clear ink upon printing.

2. The aqueous ink composition of claim 1, wherein the sulfonated polyester is present in the ink composition in an amount of from about 30 to about 50 percent by weight based upon the total weight of the ink composition.

3. The aqueous ink composition of claim 1, wherein the sulfonated polyester is present in the ink composition in an amount of from about 35 to about 45 percent by weight based upon the total weight of the ink composition.

4. The aqueous ink composition of claim 1, wherein the ink composition is substantially free of colorant.

5. The aqueous ink composition of claim 1, wherein the ink composition is free of curable monomers.

6. The aqueous ink composition of claim 1, wherein the isoprene rubber comprises cis-polyisoprene.

7. The aqueous ink composition of claim 1, wherein the isoprene rubber comprises a copolymer comprising a member of the group consisting of styrene-butadiene, styrene-isoprene, isoprene, and combinations thereof.

8. The ink aqueous composition of claim 1, wherein the isoprene rubber is present in the ink composition in an amount of from about 1.5 to about 6.5 percent by weight based upon the total weight of the ink composition.

9. The aqueous ink composition of claim 1, wherein the co-solvent is present and is selected from the group consisting of sulfolane, methyl ethyl ketone, isopropanol, 2-pyrrolidinone, polyethylene glycol, and mixtures thereof.

10. The aqueous ink composition of claim 1, wherein the ink composition has the characteristic of providing substantially 100 percent transfer from a blanket to a substrate in an offset printing process.

11. A process of digital offset printing, the process comprising:
    applying an aqueous ink composition onto a re-imageable imaging member surface at an ink take up temperature, the re-imageable imaging member having dampening fluid disposed thereon;
    forming an ink image;
    transferring the ink image from the re-imageable surface of the imaging member to a printable substrate at an ink transfer temperature;
    wherein the aqueous ink composition comprises:
    water;
    an optional co-solvent;
    a sulfonated polyester, wherein the sulfonated polyester has a degree of sulfonation of at least about 7.5 mol percent;

wherein the sulfonated polyester is of the formula:

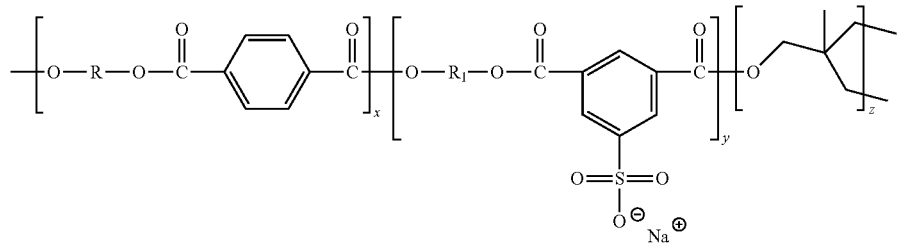

wherein R is an alkylene of from 2 to about 25 carbon atoms;
wherein $R_1$ is wherein R is an alkylene of from 2 to about 25 carbon atoms;
wherein x is from about 10 to about 100,000;
wherein y is about 7.5 mol percent;
wherein z is from about 10 to about 100,000; and
an isoprene rubber;
wherein the aqueous ink composition has a first viscosity of from about 3,000 to about 90,000 centipoise at an ink take up temperature of from about 45° C. to about 80° C. and a second viscosity of from about 100,000 to about 2,000,000 centipoise at an ink transfer temperature of from about 18° C. to about 30° C.; and
wherein the ink composition is substantially colorless or is a tinted clear ink upon printing.

12. The process of claim 11, wherein the sulfonated polyester is present in the aqueous ink composition in an amount of from about 35 to about 45 percent by weight based upon the total weight of the ink composition.

13. The process of claim 11, wherein the ink composition is free of curable monomers.

14. A process comprising:
combining a sulfonated polyester resin, wherein the sulfonated polyester has a degree of sulfonation of at least about 7.5 mol percent, wherein the sulfonated polyester is of the formula:

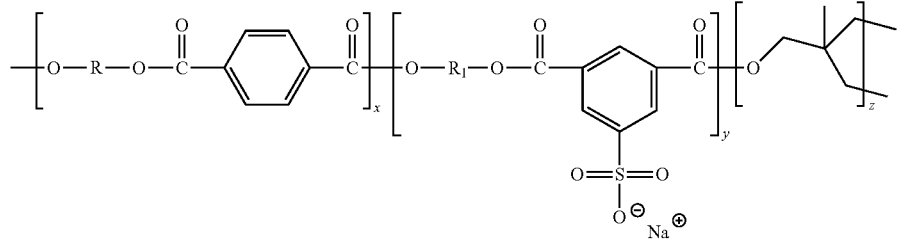

wherein R is an alkylene of from 2 to about 25 carbon atoms;
wherein $R_1$ is wherein R is an alkylene of from 2 to about 25 carbon atoms;
wherein x is from about 10 to about 100,000;
wherein y is about 7.5 mol percent;
wherein z is from about 10 to about 100,000;

water, an optional co-solvent, and an isoprene rubber to form an aqueous ink composition, wherein the aqueous ink composition is substantially colorless or is a tinted clear ink upon printing.

15. The process of claim 14, wherein the sulfonated polyester is present in the aqueous ink composition in an amount of from about 35 to about 45 percent by weight based upon the total weight of the ink composition.

* * * * *